May 23, 1933.  W. R. HAINSWORTH ET AL  1,910,538
ABSORPTION REFRIGERATING APPARATUS
Filed April 28, 1931   2 Sheets-Sheet 1
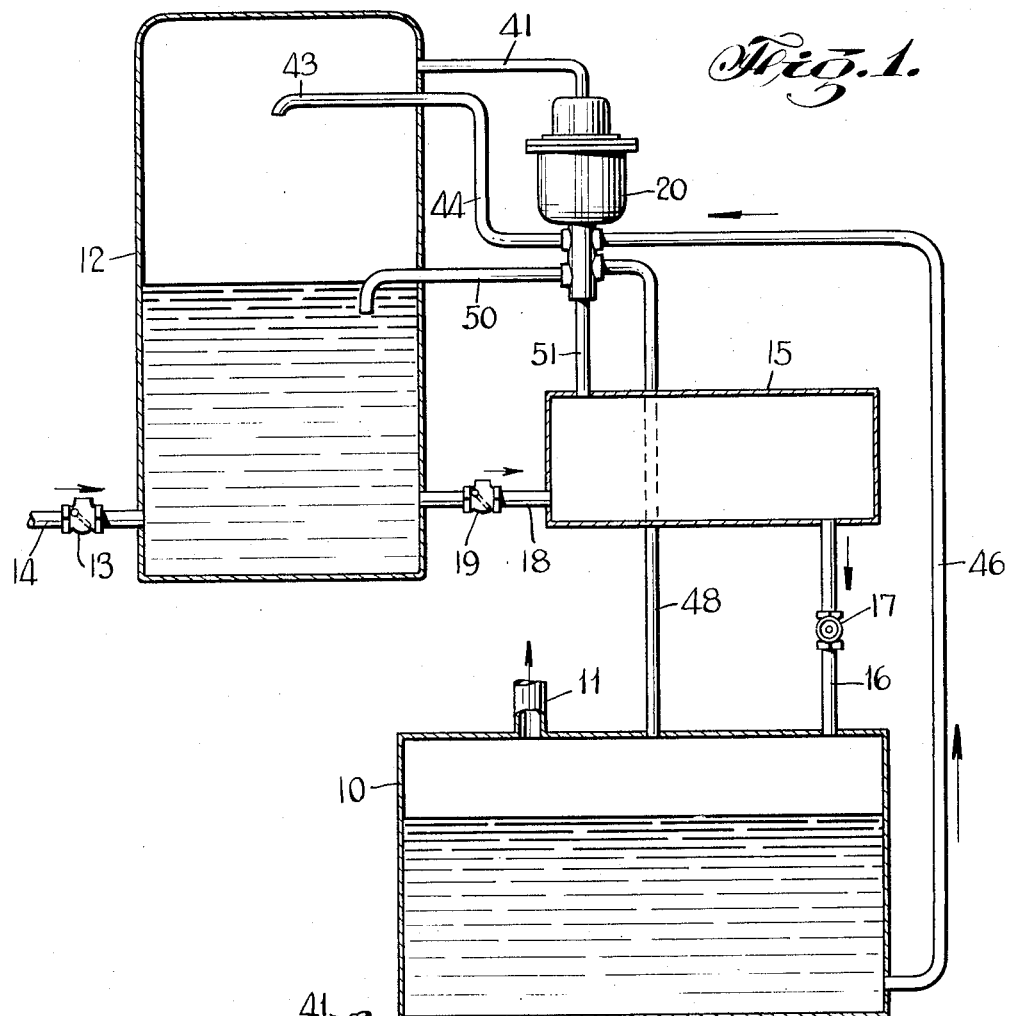
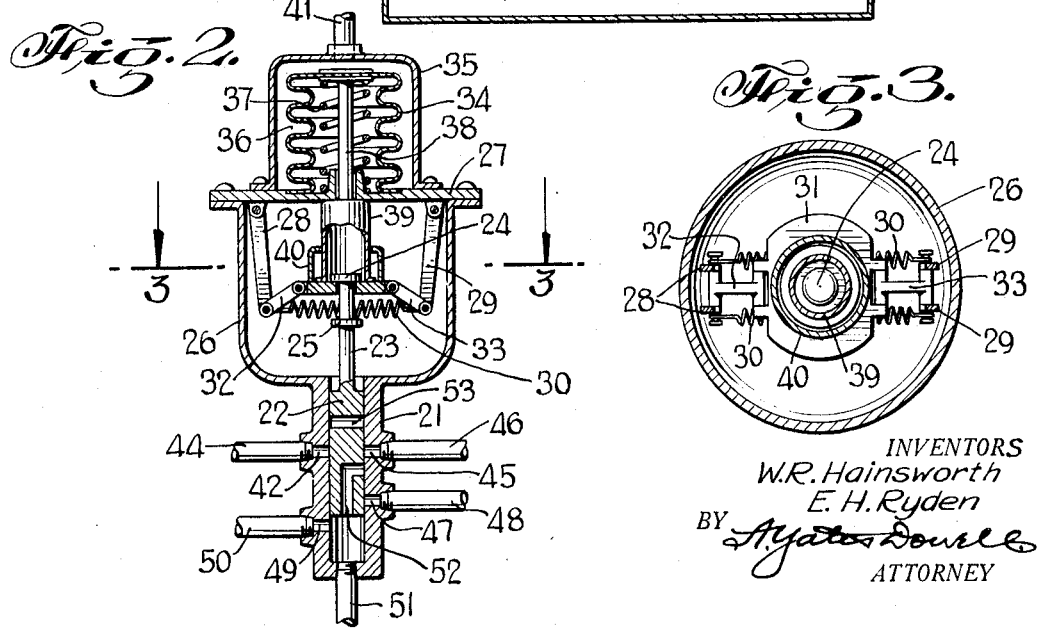
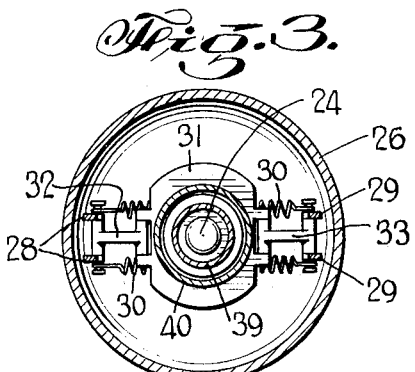
INVENTORS
W. R. Hainsworth
E. H. Ryden
BY
ATTORNEY

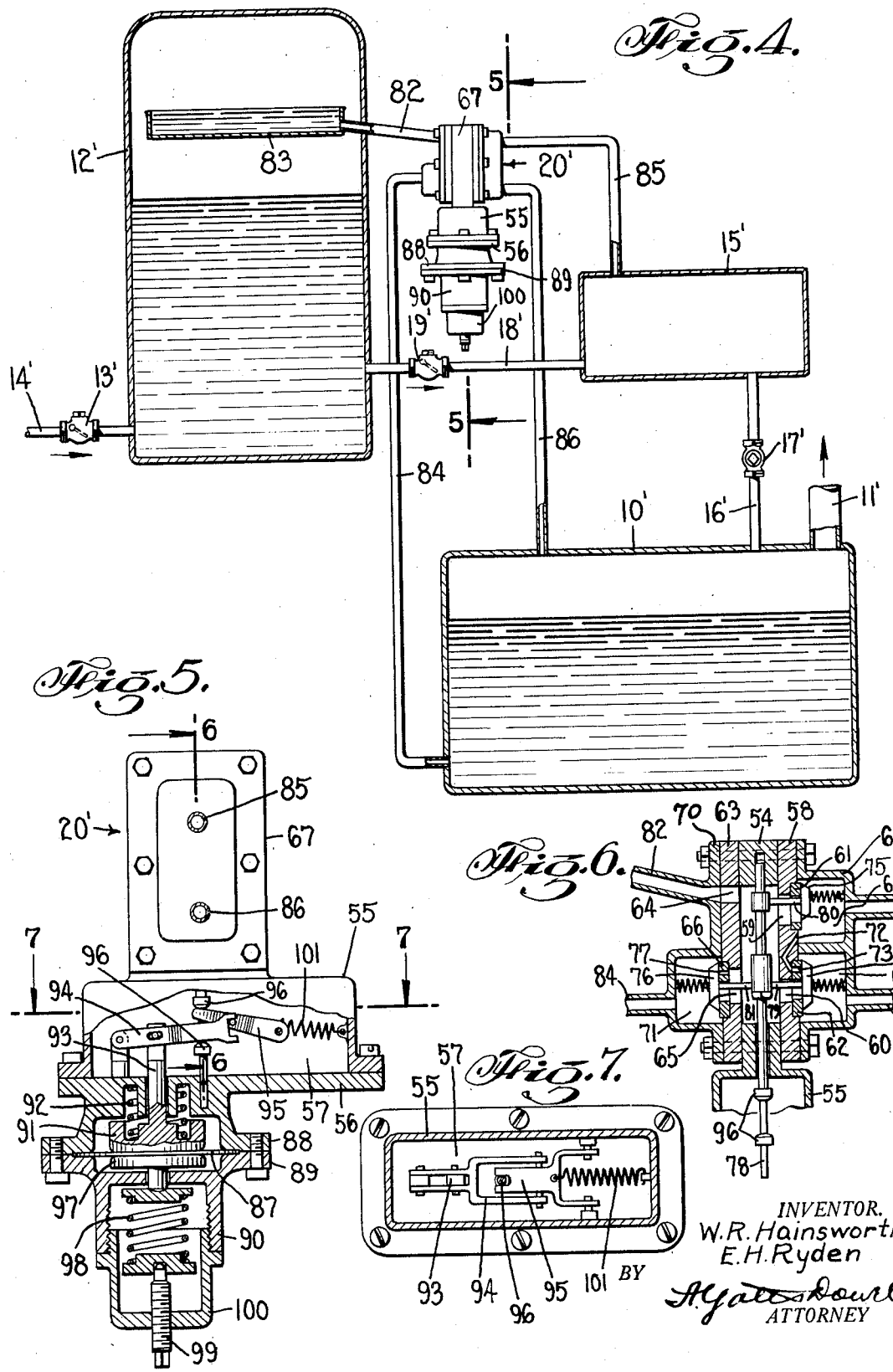

Patented May 23, 1933

1,910,538

UNITED STATES PATENT OFFICE

WILLIAM R. HAINSWORTH, OF LARCHMONT, AND ERIC H. RYDEN, OF NEW YORK, N. Y., ASSIGNORS TO ELECTROLUX SERVEL CORPORATION, OF NEW YORK, N. Y., A CORPORATION OF DELAWARE

ABSORPTION REFRIGERATING APPARATUS

Application filed April 28, 1931. Serial No. 533,402.

This invention relates to absorption refrigerating apparatus of the continuous type and more specifically to the circulation of absorption liquid between the generator and absorber in such apparatus in which a difference in pressure exists between the generator and absorber.

It is an object of this invention to effect the simultaneous transfer of weak absorption liquid from the generator to the absorber and enriched absorption liquid from the absorber to the generator responsive to the vapor pressure in the absorber.

A further object is to effect the transfer by applying forces generated entirely within the system.

Other objects and advantages will be apparent from the following description taken in connection with the accompanying drawings, wherein, Fig. 1 shows a generator and absorber of the well known absorption type continuous refrigerating apparatus and the valve arrangement for the circulation of absorption liquid as contemplated by this invention;

Fig. 2 is a vertical section of the valve shown in Fig. 1;

Fig. 3, a section taken on line 3—3 in Fig. 2;

Fig. 4, a modified valve arrangement contemplated by this invention;

Fig. 5, a vertical section of the modified valve operating mechanism;

Fig. 6, a vertical section of the modified valves; and

Fig. 7, a detail section taken on the line 7—7 of Fig. 5.

Referring to Fig. 1 of the drawings a generator 10 contains a solution of refrigerant in an absorption liquid and is adapted to be continuously heated by any desirable means. Refrigerant vapor expelled from solution in the generator passes through pipe 11 to the usual cooling circuit, not shown, comprising a condenser, expansion valve, and coil, from which latter refrigerant gas passes to the absorber 12 through check valve 13 in pipe 14. A vessel 15 located intermediate the generator and absorber is connected to the former through pipe 16 in which there is a check valve 17 and to the latter through pipe 18 in which there is a check valve 19.

As shown in Fig. 2 the control valve 20 contemplated by this invention comprises a valve casing 21 in which reciprocates a valve member 22. The latter has an upwardly extending valve rod or stem 23 on which there are two spaced collars, an upper collar 24 and a lower collar 25. The upper part of the valve casing 21 is constructed to form an open top or cup-like vessel 26 which is closed by a plate member 27 on which is mounted the valve operating mechanism. On the lower side of plate 27 is suspended a toggle mechanism comprising levers 28 and 29 each pivoted at its upper end to a projection on the plate 27 and having their lower ends connected to be urged together by a pair of springs 30 as shown in Fig. 3. A member 31 is suspended between the lower ends of the levers 28 and 29 by two intermediate levers 32 and 33 and is arranged in relation to the valve rod 23 in such a manner as to engage the collar 24 in its upward movement and collar 25 in its downward movement, the distance between the collars determining the amount of motion in the toggle before movement is imparted to the valve rod. When the member 31 is above the line of tension of the springs 30 it is urged by the action of the springs upwardly and when it is below the line of tension of the springs it is urged downwardly. The distance between the collars 24 and 25 on the valve rod 23 is such that the member 21 must be past the line of tension of the springs in either direction before either collar is engaged whereby a snap action of the valve 22 results in both directions.

On the upper side of the plate 27 is mounted a sylphon bellows 34 over which there is secured a casing 35 enclosing a fluid tight chamber 36 around the outside of the bellows. The latter is retained in its normal position by a spring 37 and is connected to shift the toggle on the lower side of the plate 27 by a rod 38 secured to the free end of the bellows and extending through a guide in the plate 27. A cylinder 39 flanged outwardly at its lower end is connected to the lower end of the rod 38 and cooperates with the toggle member 31 and a cylinder 40 flanged inwardly at its upper end and attached to the toggle member to form a lost motion connection for shifting the toggle responsive to that movement of the bellows 34.

The chamber 36 around the bellows 34 communicates with the vapor space in the upper part of the absorber 12 through pipe 41. A valve port 42 in the valve casing 21 is connected to the discharge pipe 43 in the upper part of the absorber through pipe 44 and a corresponding port 45 on the opposite side of the valve casing is connected through pipe 46 to the lower part of the generator 10. A port 47 in the valve casing 21 is connected to the vapor space in the generator through pipe 48 and a port 49 is connected to the absorber through pipe 50. The lower end of the valve casing 21 is connected through pipe 51 to the top of the intermediate vessel 15.

When the absorber 12 contains weak absorption liquid the vapor pressure in the upper part of the absorber is low due to the ready absorption of the refrigerant vapor in the liquid. Therefore the bellows of the control valve 20 is fully expanded and the valve 22 is held by the toggle arrangement in its upper position, in which position of the valve the upper part of the intermediate vessel 15 is open to the absorber through pipe 51, port 49, which is uncovered, and pipe 50; but ports 42, 45 and 47 are closed thereby cutting off the generator pressure in pipe 48 and the supply of weak absorption liquid to the absorber through pipes 46 and 44. As the concentration of the liquid in absorber 12 increases due to the absorption of refrigerant vapor entering from the evaporator through the pipe 14 the vapor pressure in the upper part of the absorber increases until it reaches a value sufficient to compress the bellows 34 downwardly to shift the member 31 of the toggle downwardly past the line of tension of the springs 30 whereupon the valve 22 is snapped into its lower position by the force of the springs.

When the valve member 22 is in its lower position valve port 49 is closed and valve port 47 communicates with pipe 51 through passage 52 in the valve member 22, thus establishing connection between the vapor space in the generator 10 and the upper part of the intermediate vessel 15 through pipe 48, valve port 47, passage 52 and pipe 51 thus equalizing the pressures in these two elements whereupon enriched absorption liquid which has accumulated in the intermediate vessel 15 flows through pipe 16 into the generator. While the intermediate vessel is under generator pressure the check valve 19 is held closed thus cutting off communication with the absorber. Also in the lower position of the valve member 22 ports 42 and 45 are connected through passage 53 in the valve member 22 thus allowing weak absorption liquid from the generator to flow through pipe 46 and pipe 44, discharging into the absorber 12 through discharge pipe 43.

As weak absorption liquid enters the absorber the pressure therein is decreased until the sylphon bellows 34 of the control valve 20 expands, aided by the action of the spring 37, to shift the toggle upwardly, thus snapping the valve member 22 back to its upper position whereupon the generator pressure is cut off from the intermediate vessel 15 by the closing of valve 47 and the pressure relieves from the intermediate vessel into the absorber through pipe 51, valve port 49 and pipe 50 and the cycle is repeated.

To obviate any difficulty which might arise in the system just described due to the possibility of leakage past the valve member 22 resulting in a back pressure on the valve operating mechanism, the modification shown in Figs. 4 to 7 inclusive may be found preferable from a practical standpoint.

Referring to Fig. 4, a generator 10', absorber 12', and an intermediate vessel 15' are connected in a refrigerating system, as described in connection with Fig. 1. However, the control valve 20' is modified as shown in detail in Figs. 5 to 7 inclusive, by which modification the number of connections to the absorber are reduced by two.

The control device 20' consists of a frame 54 mounted integrally on a casing 55 which when assembled acts as a cover for casing 56 enclosing a chamber 57. A plate 58 attached to one side of the rectangular frame 54 has slot openings 59 and 60 and carries the valve seats 61 and 62. A plate 63 attached to the other side of the rectangular frame has slot openings 64 and 65 and carries valve seat 66. A cover plate 67 positioned over the plate 58 is constructed to form a valve chamber 68 over the valve seat 61 and a chamber 69 over the valve seat 62. A cover plate 70 positioned over the plate 63 is constructed to form a chamber 71 over the valve seat 66. Communication between chambers 68 and 69 is through a passage 72 in the plate 58 which opens at one end into chamber 68 and at the other end into chamber 69 through valve opening 73 in the valve seat 62. The valve opening 73 is opened and closed by a spring-pressed valve member 74 slidable on valve seat 62. In chamber 68 a spring-pressed valve member 75 slidable on valve seat 61 opens and closes slot 59. In chamber 71 a spring pressed valve member 76 slidable on valve seat 66 opens and closes valve opening 77. The valve members 74, 75 and 76 are simultaneously operated by a single valve rod 78 by means of pins 79, 80, and 81, each of which is fastened at one end to the valve rod and extends through the slot in the valve seat to engage at its other end the respective valve member. Valve rod 78 is guided at its upper end in the frame 54 and at its lower end in the casing 56.

Referring to Figs. 4 and 6, a pipe 82 connected at one end to the overflow pan 83 in the absorber 12' is connected at its other end to the cover plate 70 so as to communicate with opening 64. A pipe 84 connected at one end to the lower part of the generator 10' communicates with chamber 71 in the valve cover plate 70. A pipe 85 connected at one end to the top of the intermediate vessel 15' is connected at its other end to chamber 68 in valve cover plate 67, and a pressure equalizing pipe 86 connected at one end to the vapor space of the generator 10' is connected at its other end to chamber 69 in the valve cover plate 67.

Referring to Fig. 5, a flexible diaphragm 87 is clamped between flange 88 of the casing 56 and flange 89 of the casing 90. A plunger 91, pressed by spring 92 against the upper side of diaphragm 87, carries a stem 93 which extends upwardly through casing 56 into chamber 57. The upper end of stem 93 is connected to move a lever 94 for shifting the spring-tensioned toggle lever 95, which cooperates with collars 96 on the valve rod 78 to snap the latter up or down. Another plunger 97 is pressed upwardly against the lower side of the diaphragm 87 by a spring 98, the tension of which may be regulated by a screw 99 in the cap 100 of the casing 90.

In operation, with weak absorption liquid in the absorber 12', check valves 13' and 19' are open and check valve 17' is held closed by the pressure in the generator which is continuously heated. There is a minimum pressure on the diaphragm 87 and valve rod 78 is at its upper position maintaining valve ports 77 and 73 closed and slot 59 open so that the pressures in the absorber and intermediate vessel are the same, and liquid from the absorber flows through conduit 18' into the intermediate vessel 15'. As refrigerant vapor from the evaporator entering through conduit 14' is absorbed by the liquid in the absorber 12' the pressure in this element increases until it reaches a predetermined limit whereupon the diaphragm 87 which is subjected to the absorber pressure is depressed, allowing the spring 92 to move the plunger 91 and lever 94 downwardly to shift the toggle lever 95 downwardly until the latter moves under the tension of spring 101 to snap the valve rod 78 to its lower position, thus closing slot 59 and opening valve ports 70 and 73.

Generator pressure is then transmitted through conduit 86, valve port 73, passage 72, and conduit 85 to the intermediate vessel 15' whereupon check valve 19' closes and check valve 17' in conduit 16' opens allowing the enriched liquid in the intermediate vessel to flow to the generator by gravity. Simultaneously weak liquid is forced from the bottom of generator 10' through conduit 84, valve port 77, and conduit 82 into the tray 83 from which it overflows in the absorber.

As weak absorption liquid enters the absorber the pressure is reduced allowing diaphragm 87 to be moved upwardly by the spring 98 which is adjustable for any absorber back-pressure by screw 99. When the diaphragm 87 moves upwardly the toggle lever 95 is shifted until it moves under the tension of spring 101 to snap the valve rod 78 to its upper position reversing the position of the valves, whereupon the generator pressure is cut off by the closing of valve port 73 and the pressure in the intermediate vessel 15' is relieved into the absorber through slot 59 in the valve plate 58. Check valve 17' is closed by the pressure in the generator and check valves 19' and 13' again open and the cycle is repeated.

It will be obvious to those skilled in the art that various other changes may be made in the construction and arrangement without departing from the spirit of the invention and therefore the invention is not limited to what is shown in the drawings and described in the specification but only as indicated in the appended claims.

We claim:

1. Absorption refrigerating apparatus including a generator, an absorber located above said generator, an intermediate vessel connected between said absorber and generator, a connection between the vapor space in said generator and said intermediate vessel, a connection between the liquid space in said generator and the absorber, and means for opening and closing said connections responsive to the pressure in the absorber.

2. Absorption refrigerating apparatus including a generator, an absorber, an intermediate vessel connected between said generator and absorber, a pressure relief pipe from said intermediate vessel to the absorber, a pressure equalizing line from the generator to said intermediate vessel, a weak absorption liquid supply line from said generator to said absorber, and means for closing said pressure relief pipe and opening said pressure equalizing line and said liquid supply line responsive to an increase of pressure in the absorber and opening said pressure relief pipe and closing said pressure equalizing line and said supply line responsive to a decrease of pressure in the absorber.

3. Absorption refrigerating apparatus including a generator, an absorber, a vessel connected between said generator and absorber, check valves in the connections of the intermediate vessel to the absorber and generator, a pressure relief pipe from said intermediate vessel to the absorber, a pressure equalizing line from the generator to said intermediate vessel, a weak absorption liquid supply line from the generator to the absorber, and pressure operated snap-acting valves for opening said pressure relief pipe and closing the other two said lines responsive to a decrease of pressure in the absorber and closing said pressure relief pipe and opening the other two said lines responsive to an increase of pressure in the absorber.

4. Absorption refrigerating apparatus including a generator, an absorber located above said generator, an intermediate vessel connected between said absorber and generator, a weak absorption liquid supply line from said generator to said absorber, a valve in said line, a two-way valve adapted to connect said intermediate vessel to the absorber in one position of the valve and to the vapor space in the generator in the other position of the valve, and means for operating said valves responsive to the pressure in the absorber.

5. In absorption refrigerating apparatus of the two-pressure continuous type means for simultaneously transferring weak absorption liquid from the generator to the absorber and enriched absorption liquid from the absorber to the generator responsive to the pressure in the absorber.

6. In absorption refrigerating apparatus of the two-pressure continuous type means for simultaneously transferring weak absorption liquid from the generator to the absorber and enriched absorption liquid from the absorber to the generator responsive to a change of one condition in the system.

7. Absorption refrigerating apparatus including a generator, an absorber located above said generator, an intermediate vessel connected between said absorber and generator, a valve for controlling the flow of weak absorption liquid from the generator to the absorber, a two-way valve adapted to connect said intermediate vessel to the absorber in one position of the valve and to the vapor space in the generator in the other position of the valve, a snap acting toggle for operating said valves, and pressure responsive means for shifting said toggle.

8. In absorption refrigerating apparatus of the two-pressure continuous type a vessel connected between the absorber and generator, a valve to control the flow of weak absorption liquid from the generator to the absorber and to connect said vessel to the absorber in one position of the valve and to the generator in the other position of the valve, a spring actuated toggle for operating said valve, and pressure responsive means for shifting said toggle.

9. In absorption refrigerating apparatus of the two-pressure continuous type a vessel connected between the absorber and generator, a valve to control the flow of weak absorption liquid from the generator to the absorber and to connect said vessel to the absorber in one position of the valve and to the generator in the other position of the valve, a spring actuated toggle for operating said valve, and a bellows adapted to shift said toggle.

10. Absorption refrigerating apparatus including a generator, an absorber above said generator, a vessel intermediate said absorber and generator, a valve for controlling the flow of weak absorption liquid from the generator to the absorber and connecting said intermediate vessel to the absorber in one position of the valve and to the generator in the other position of the valve, a snap acting toggle for operating said valve, and means responsive to the pressure in the absorber for shifting said toggle.

11. Absorption refrigerating apparatus including a generator, an absorber above said generator, a vessel intermediate said absorber and generator, a valve for controlling the flow of weak absorption liquid from the generator to the absorber and connecting said intermediate vessel to the absorber in one position of the valve and to the generator in the other position of the valve, a snap acting toggle for operating said valve, and a bellows subjected to the pressure in the absorber and operably connected to shift said toggle responsive to a predetermined change of pressure in the absorber.

12. Absorption type refrigerating apparatus including a generator, an absorber above said generator, an intermediate vessel connected between said absorber and generator, a control chamber in open communication with said absorber, a pressure relief line from said intermediate vessel to said chamber, a weak liquid supply line from said generator to said chamber, a pressure equalizing line from said generator to said intermediate vessel, valves in said lines, and means responsive to the pressure in said chamber for operating said valves.

13. Absorption type refrigerating apparatus including a generator, an absorber located above said generator, an intermediate vessel connected between said absorber and generator, a control chamber in open communication with said absorber, a pressure relief line from said intermediate vessel to said chamber, a weak liquid supply line from the generator to said chamber, a pressure equalizing line from the generator to said intermediate vessel, and means for opening said weak liquid supply and pressure equalizing lines and closing said pressure relief line upon a predetermined pressure increase in said chamber, and closing said liquid supply and pressure equalizing lines and opening said pressure relief line when the pressure decreases.

14. Absorption type refrigerating apparatus including a generator, an absorber located above said generator, an intermediate vessel located between said absorber and generator, a control chamber in open communication with said absorber, a pressure responsive device subjected to the pressure in said chamber, a pressure relief line from said intermediate vessel to said chamber, a weak liquid supply line from said generator to said intermediate vessel, and valves in said lines adapted to be simultaneously operated by said pressure responsive device.

In testimony whereof we affix our signatures.

WILLIAM R. HAINSWORTH.
ERIC H. RYDEN.